United States Patent [19]

Chalmers

[11] 3,887,130
[45] June 3, 1975

[54] SULFUR PELLETIZING
[75] Inventor: William W. Chalmers, Calgary, Alberta, Canada
[73] Assignee: Canadian Occidental Petroleum, Ltd., Calgary, Alberta, Canada
[22] Filed: Sept. 20, 1973
[21] Appl. No.: 399,258

[52] U.S. Cl. .................................. 239/132.5
[51] Int. Cl. ............................................ B05b 15/00
[58] Field of Search ......... 239/82, 85, 79, 134, 138, 239/133, 132.5, 128

[56] References Cited
UNITED STATES PATENTS

| | | | |
|---|---|---|---|
| 2,894,569 | 7/1959 | Jacolev | 239/132.5 |
| 3,076,607 | 2/1963 | Cordier | 239/132.5 |
| 3,776,462 | 12/1973 | Payne, Jr. | 239/134 |
| R22,964 | 1/1948 | Burch | 239/132.5 |

*Primary Examiner*—Lloyd L. King

[57] ABSTRACT

Solid sulfur pellets are prepared from molten sulfur using a gun and pelletizing chamber. Sulfur is ejected from a gun in a form of a thin sheet and dispersed and solidified into solid pellets with a water jet. The pellets and water are separated. The apparatus consists of a gun for projecting molten sulfur as a plurality of jets, a pelletizing chamber wherein the jets of sulfur are dispersed and solidified into a plurality of solid sulfur pellets by a water jet.

6 Claims, 7 Drawing Figures

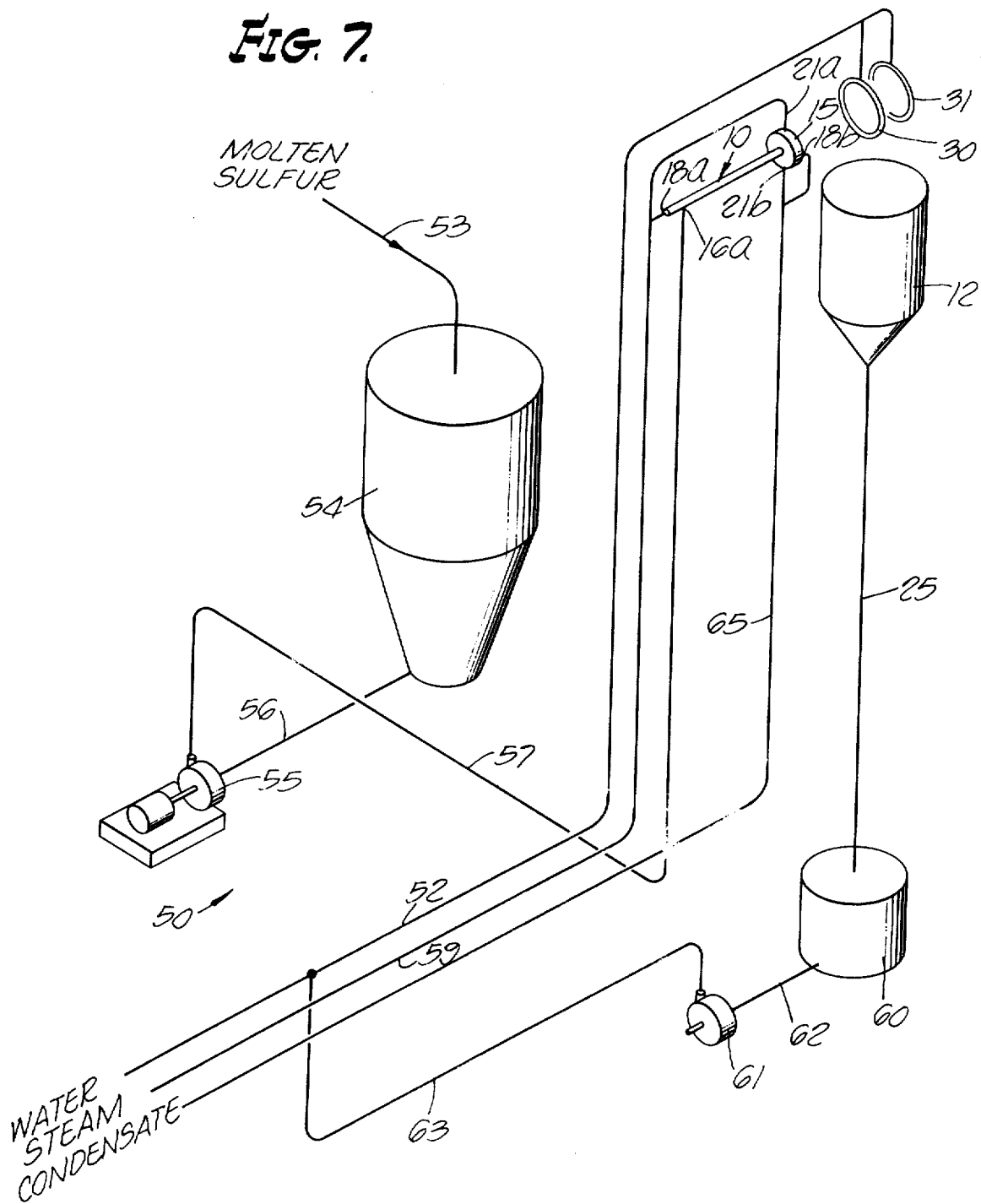

SULFUR PELLETIZING

BACKGROUND OF THE INVENTION

The present invention relates to a method and apparatus for prilling sulfur. More particularly, this invention relates to a method and apparatus for preparing hard beads or prills of elemental sulfur.

Sulfur is one of the essential elements needed for plant life. In many areas of the world, there is an insufficient amount of sulfur in the soil to adequately support plant life. Moreover, in alkaline soils, sulfur is not only needed to support plant life, but is also required as a soil supplement. As a soil supplement, sulfur increases the water intake and aeration of the soil, improves the physical conditions of the soil, eliminates the harmful alkalinity and sodium problems of the soil, and increases the availability of certain nutrients and elements for plant growth and life.

Elemental sulfur can be added to the soil in many forms such as: the sulfate form, e.g., calcium sulfate; the sulfide form, e.g., ammonium sulfide or calcium sulfide, elemental sulfur and the like. Elemental sulfur is preferred because it is oxidized in the soil by microorganisms to a form which is the desirable form for plant nitrition and soil improvement.

Elemental sulfur is available in many forms, such as pellets, flake sulfur, ground sulfur, finely powdered sulfur and the like. Finely powdered sulfur is rarely used because it is difficult to handle and easily becomes air born to form dust clouds. Sulfur dust is very irritating to the lungs of both man and animal and presents an explosive hazard.

Flake sulfur contains a large percentage of water and is easily broken up during transportation and handling creating dust fines which are easily air born. Ground sulfur is also difficult to handle and tends to powder upon handling and during transportation. Prilled or pellet sulfur is an improvement over the above forms of sulfur; however, the prilled or pellet sulfur formed by the conventional methods contains a high percentage of water, is somewhat friable and is easily broken up during transport and handling creating dust fines, and is not uniform in size.

The present invention provides a method and apparatus for producing prilled sulfur which has a low percentage of water, is durable and not readily friable and, is of uniform size.

Many attempts have been made in the prior art to produce a prilled sulfur having properties of the prilled sulfur produced by the present invention without success. For example, the U.S. Perry Pat. No. 1,285,358 discloses a process for the preparation of globules which comprises spraying molten sulfur into air wherein small globular bodies of sulfur are formed. The U.S. Bacon et al U.S. Pat. No. 1,378,084 and the Campbell U.S. Pat. No. 3,334,159 both disclose somewhat similar methods for prilling sulfur. These methods consist of allowing molten sulfur to drop through a perforated plate to form droplets or shot like bodies of sulfur which are immediately immersed in a cool aqueous solution to solidify the molten sulfur shot. These processes produce sulfur pellets of non-uniform size, containing a high water content. The Nashner et al U.S. Pat. No. 3,034,864 and the Laducci et al U.S. Pat. No. 3,484,201 disclose a method for preparing sulfur prills from sulfides. Metal sulfides are oxidized to form molten elemental sulfur globules in an aqueous sulfuric acid slurry. The slurry is cooled to solidify the sulfur globules. These processes yield sulfur pellets of non-uniform size, contaminated with water and/or other impurities. The Canadian Pat. No. 824,608 (issued Oct. 7, 1969) discloses a method for prilling sulfur by spraying molten sulfur out of a gun. The sulfur spray is cooled with steam and/or water to solidify the sulfur pellets which fall to the ground and are collected. This process has been commercially used and produced sulfur pellets having fairly good handling characteristics, but the pellets are not particularly uniform in size. The British Pat. No. 763,936, published Dec. 19, 1956 discloses a variant of the Nashner et al and Landucci et al process described above. The British process consists of dispersing impure sulfur in an aqueous sulfuric acid at temperatures exceeding the melting point of sulfur to agglomerate the sulfur into pellets. The molten pellets are separated from the slurry and dispersed in water containing a surfactant for the sulfur impurities. The water is heated to a temperature in excess of the melting point of sulfur to obtain agglomeration and then is cooled to below the melting point of the sulfur to solidify the sulfur globules. The process disclosed in British Pat. No. 1,001,486 is a variant of the above process. In this process, molten sulfur is dispersed in an aqueous medium to form molten sulfur globules. The sulfur globules are then cooled to form solid discrete particles of sulfur which are separated from the aqueous medium. In all the above processes wherein the sulfur pellets are formed in an aqueous medium and solidified therein, the resulting pellets contain a fair quantity of water and the other impurities contained in the aqueous medium.

SUMMARY OF THE INVENTION

In the present invention, molten sulfur is shot from a sulfur gun as a plurality of discrete streams or jets of molten sulfur. The streams of molten sulfur are shattered by a plurality of water jets to form globules of molten sulfur of substantially uniform size. Alternatively, steam jets can be used to shatter the streams of molten sulfur. The globules of molten sulfur are rapidly cooled by a water/steam fog or mist and are thereafter passed through the air to dry them prior to their collection. The resulting pellets have a hard, glistening surface which is fairly impervious to water.

The equipment employed in the present invention consists of the sulfur gun and a pelletizing chamber. The gun has a barrel, a head and an interchangeable spray nozzle unit. The pelletizing chamber is positioned, approximately, perpendicular to the gun. On one side of the pelletizing chamber is located a large aperture through which the streams of molten sulfur from the gun are shot into the chamber. In the chamber water/steam jets are employed to shatter the streams of molten sulfur to form molten sulfur pellets. In addition, a water/steam spray in the chamber is used to cool and solidify the molten sulfur pellets. On the other side of the chamber, there is a second aperture larger than the first aperture through which the cooled solidified sulfur pellets pass and exit into the air. The pellets fall through the air to a recovery area. A substantial proportion of the water from the water jet and water fog remains in the chamber and falls to the bottom thereof wherein it can be collected, pumped to a holding tank and then pumped back to the water jets and nozzles of the chamber.

DESCRIPTION OF THE DRAWINGS

FIG. 7 is a perspective view of a sulfur pelletizing plant of the present invention.

DETAILED DESCRIPTION OF THE INVENTION

Figure 1:
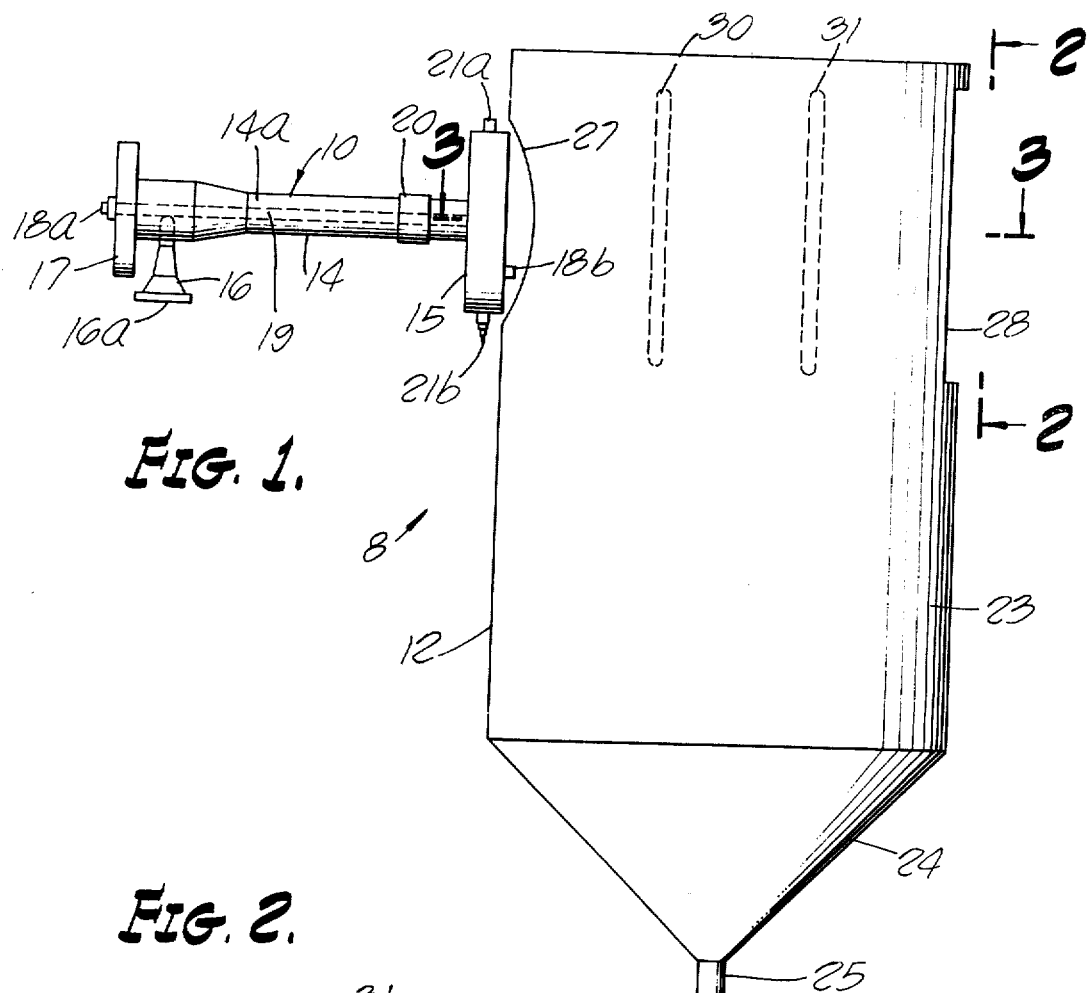
FIG. 1 is a side view of sulfur pelletizing apparatus of the present invention.

The sulfur prilling apparatus 8 of the present invention is illustrated in FIG. 1. The apparatus 8 consists of a sulfur gun 10 and a prilling chamber 12. The gun 10 has a barrel 14, a head 15 attached to one end of the barrel, and a support base 16 which is secured to the barrel near its other end. Within the barrel 14 there is a chamber 14a for molten sulfur. The gun 10 is balanced about the support base 16 by a counter-weight 17 which is attached to the end of the barrel 14 opposite the head 15. The base 16 has an inlet 16a for molten sulfur which communicates with the chamber 14a. An inlet 18a is located at this end of the barrel and is in communication with a steam conduit 19 which is in communication with a central heating chamber 38 in the head 15 as is further described in FIG. 3. A condensate stream outlet 18b is located on the front of head 15. The conduit 19 is positioned coaxially within the barrel 14. The outer wall of conduit 19 and the inner wall of the barrel 14 define the boundaries of the chamber 14a. The head 15 and the barrel 14 are connected by sleeve 20. A steam inlet 21a is connected to the top of the head 15 and a steam/condensate outlet 21b is connected to the bottom of the head 15. The inlet 21a and outlet 21b are connected to a heating chamber 41 in head 15 as described below and shown in FIG. 3.

The prilling chamber 12 has a vertically oriented cylindrical wall 23, the bottom portion which is connected to a conical base 24.

A water outlet 25 is connected to the apex of the conical base 24. The cylindrical wall 23 has a circular opening 27 on the left side and a square opening 28 on the right side opposite opening 27 and coaxial therewith. Two conduit rings, 30 and 31 are located in chamber 12 between openings 27 and 28 and coaxial therewith. The gun 10 is approximately coaxial with the two openings 27 and 28.

Figure 2:
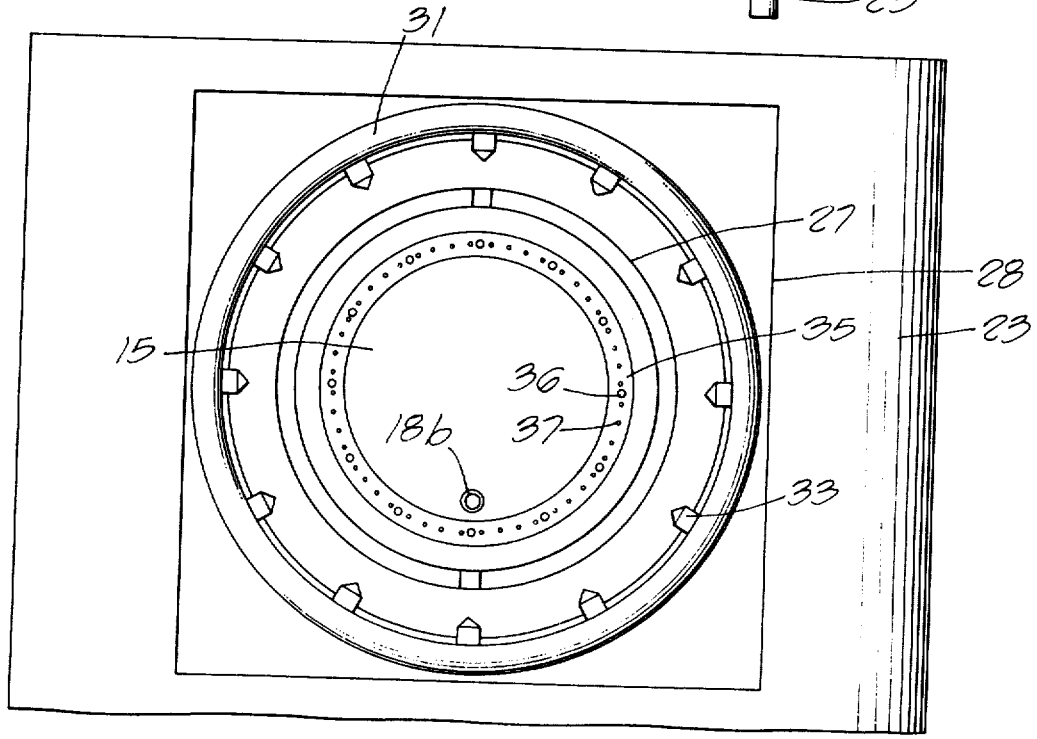
FIG. 2 is a cross-sectional view of the sulfur pelletizing apparatus for the present invention taken along line 2—2 of FIG. 1.

The head 15, the openings 27 and 28, and the ring 31 are illustrated in FIG. 2. As can be seen in FIG. 2, the opening 27 is slightly larger than the diameter of the head 15. Similarly, the width and the height of opening 28 is slightly larger than the diameter of the conduit ring 31. A series of water nozzles 33 are circumferentially positioned around the inner side of the ring 31 and extend radially inward therefrom. Nozzles 33 are water fog or spray nozzles. A series of water jet nozzles 34 (see FIG. 3) are circumferentially positioned around the inner side of the ring 30 and extend radially inward therefrom in a fashion similar to nozzles 33 on the ring 31. On the face of the head 15 there is an annular nozzle plate 35 which is secured to the face of head 15 by a plurality of retaining screws 36. Circumferentially spaced about the annular plate 35, approximately equal distance, are a plurality of apertures 37.

Figure 3:
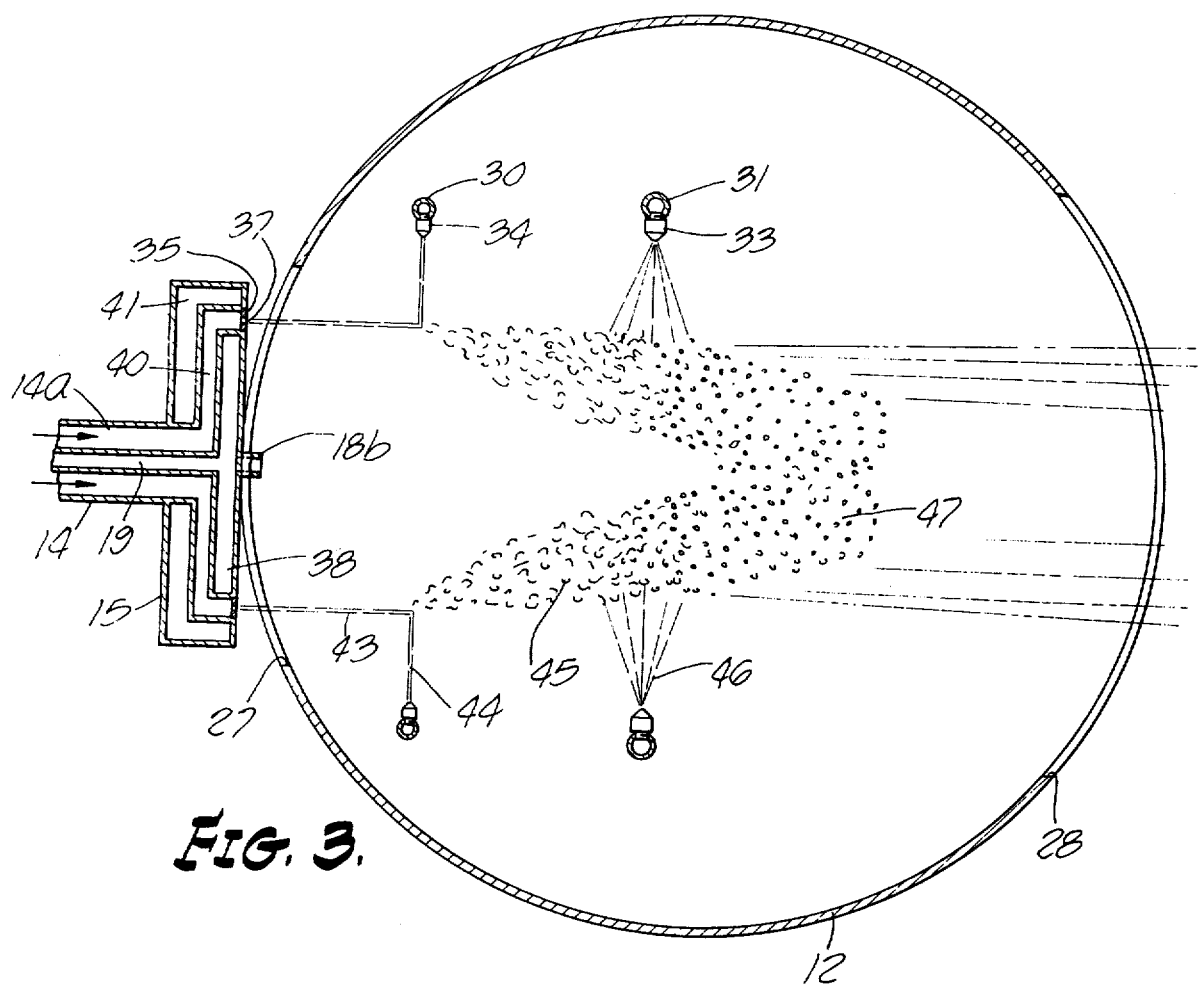
FIG. 3 is a top-sectional view of the sulfur pelletizing apparatus for the present invention taken along lines 3—3 of FIG. 1.

In FIG. 3, the relationship between the openings 27 and 28, rings 30 and 31 and the gun 10 is clearly shown. Conduit 19 within the barrel 14 communicates with a central heating chamber 38 in head 15. Chamber 14a communicates with a distributing chamber 40 which is turn communicates with apertures 37 of the plate 35. Inlet 21a and outlet 21b (see FIG. 1) communicate with an outer heating chamber 41 in the head 15. The chamber 38 communicates with outlet 18b. Within the chamber 12, there are located the conduit rings 30 and 31. The ring 30 has a plurality of jets for water and/or steam 34 which are circumferentially spaced within the ring 30 and directed radially inward. In a similar fashion, the ring 31 has a plurality of spray or mist nozzles 33 which are spaced circumferentially within the ring and directed radially inward.

Figure 4:
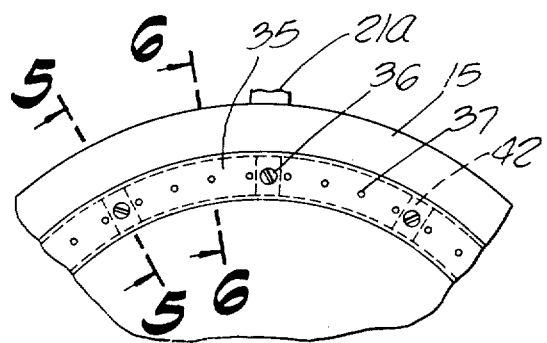
FIG. 4 is a front-sectional view of the sulfur pelletizing gun for the present invention.
Figures 5, 6:
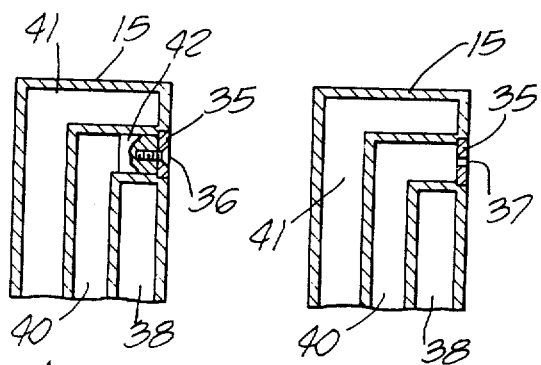
FIG. 5 is an enlarged cross-sectional view of the pelletizing gun head taken along lines 5—5 of FIG. 4.
FIG. 6 is another enlarged cross-sectional view of the head of the pelletizing gun head taken along lines 6—6 of FIG. 4.

Details of the annular nozzle 37 on the face of head 15 are shown in FIG. 4. The face of head 15 has an annular opening of the required dimensions to receive the annular plate 35; circumferentially around this annular opening, there are located a plurality of support lugs 42 which support and brace the plate 35. Each lug has a threaded hole adapted to receive a retaining screw 36. The relationship of the support lug 42, retaining screws 36 and annular plate 35 is shown in detail in FIG. 5. The relationship between the distribution chamber 40 and apertures 37 in the annular plate 35 is clearly shown in FIG. 6.

A sulfur pelletizing plant 50 is illustrated in FIG. 7. Molten sulfur is received at the pelletizing plant 50 through line 53 which discharges into a holding tank 54 where the molten sulfur is maintained at a controlled temperatuure for pelletizing. A pump 55 pumps the molten sulfur from tank 54 via line 56 and line 57 into the sulfur pelletizing gun 10 via inlet 16a. Steam is supplied from a heating system (not shown) to inlets 18a and 21a of gun 10 via steam line 59. Water for the jet and fog ring conduits 31 and 30 is pumped from a reservoir tank 60 by a pump 61 through lines 62, 63 and 52 into rings 30 and 31. Water sprayed from the rings 30 and 31 is collected in the bottom of prilling chamber 12 (shown in cut-away) and fed into the holding tank 60 via conduit 25. The discharged steam and condensate from the gun 10 is discharged through outlets 21b and 18b (shown in FIG. 1) and conduit 65 for recycle to the heating system (not shown).

The operation of pelletizing method is illustrated in FIG. 3. Hot steam/water is passed into central heating chamber 38 via the conduit 19. Similarly, hot steam is passed into the outer heating chamber 41 by way of inlet 21a. Molten sulfur is pumped into chamber 14a via inlet 16a. The sulfur flows into distribution chamber 40 wherein, under pressure, it is forced out through apertures 37 of the annular plate 35 to form a plurality of discrete streams 43 of molten sulfur. The sulfur normally is introduced into the gun under a pressure of about 50 psig although other pressures are applicable. A plurality of water jets 44 from water jet nozzles 34 collide with the streams 43 at approximately a perpendicular angle and disperse the streams of molten sulfur into globules of molten sulfur 45 having a substantially uniform size. The water jets normally have a pressure of from about 75 to about 100 psig, although other pressures can be employed. The initial momentum of the molten sulfur carries the molten sulfur globules 45 across the width of the prilling chamber 12 wherein the globules 45 of molten sulfur enter a zone of water spray/fog 46 from nozzles 33. The water spray/fog 46 cools and solidifies globules 45 into sulfur pellets 47. The momentum of the solid sulfur pellets 47 is sufficient to carry the pellets across the remaining distance of chamber 12 out through opening 28 into the air where the pellets fall to a recovery area (not shown). Most of the water from water jets 44 and the water fog or spray 46 remains within the confines of chamber 12 and falls to the bottom thereof. The slight amount of water that does adhere to the pellets 47 is rapidly evaporated and removed from the pellets by the air as the hot pellets 47 fall downward towards the recovery bed. Alternatively, the pellets can be projected through a drying chamber (not shown) wherein the pellets are dried with forced air counter-currently.

The size of the pellets is controlled by the size of apertures 37, by the velocity of stream 43, and/or by the force of jet 44. Normally, the force of jet 44 and the velocity of stream 43 will remain fairly constant and it is easy to adjust the sulfur pellet size by employing different annular nozzles 35 with different size openings and spacing relationships.

The sulfur in holding tank 54 is controlled to a temperature between 245° and about 265°F. The molten sulfur is then pumped to gun 10 at a relatively constant pressure. The gun is normally positioned horizontally.

It can be readily seen, that the sulfur prilling apparatus for the present invention is relatively simple and economical to maintain and operate. The annular nozzle 35 can be readily changed. The prilling chamber 12 is large and provides easy access for maintenance and cleaning.

The momentum of the sulfur streams 43 is generally sufficient to project the solidified sulfur pellets 47 for about 60 to about 100 feet from the gun, thus allowing adequate time for air drying of the pellets and providing that the base and the area around the chamber 12 remain free of sulfur.

Normally sulfur pellets range from about 0.5mm to about 5mm in diameter and can be readily manufactured by the present method and apparatus.

What is claimed is:

1. A sulfur pelletizing gun having a barrel sealed at one end and a head with a back plate attached to the second end of said barrel, said barrel containing a coaxial conduit running the length of the barrel and defining a first chamber which is adapted to transport molten sulfur therethrough and a second chamber separate from, but adjacent to said first chamber adapted to transport a heating fluid therethrough which will supply sufficient heat to maintain the sulfur in said first chamber in a molten state, said barrel having first and second inlets in communication with said first and second chambers respectively and first and second outlets in communication with said first and second chambers respectively said head having a face plate opposite said back plate which is perpendicular to the central axis of the barrel, said head having sulfur and heating chambers in communication with said first and second outlets respectively for receiving molten sulfur and heating fluid respectively; said heating chamber being adjacent to said sulfur chamber so that heat from heating fluid passing through said heating chamber will maintain sulfur in said sulfur chamber in a molten state, said heating chamber having an outlet in said head, said head having a nozzle attached to said face plate, said nozzle having a plurality of apertures with central axes perpendicular to said face plate and parallel to the barrel's central axis, which are in communication with said sulfur chamber and through which jets of molten sulfur can be ejected.

2. The apparatus, according to claim 1 wherein said head has a second heating chamber adjacent to said sulfur chamber and spaced apart from said first heating chamber and an inlet and outlet communicating with said second heating chamber.

3. The apparatus, according to claim 1 wherein the apertures in said nozzle are arranged in a circular configuration.

4. The apparatus, according to claim 1 wherein said nozzle is an annular plate removably attached to said head.

5. The apparatus according to claim 1 wherein said head is removably attached to said barrel.

6. The apparatus according to claim 1 wherein the barrel is a cylindrical tube and the conduit is a second cylindrical tube, the second heating chamber is defined by the inner walls of the second cylindrical tube mounted coaxially within said barrel and the sulfur first chamber is defined by the inner walls of the barrel and the outer wall of said second cylindrical tube.

* * * * *